United States Patent [19]
Kugle et al.

[11] 3,863,849
[45] Feb. 4, 1975

[54] DUST ABATEMENT SYSTEM FOR MIXING APPARATUS

[75] Inventors: John L. Kugle; Robert C. Futty, both of Lancaster, Pa.

[73] Assignee: Irl Daffin Associates, Inc., Lancaster, Pa.

[22] Filed: Oct. 5, 1973

[21] Appl. No.: 403,886

[52] U.S. Cl. ........... 241/152 A, 241/76, 241/101 B, 241/101.7
[51] Int. Cl. ...... B02c 9/04, B02c 13/04, B07b 4/00
[58] Field of Search ............. 241/43, 54, 76, 77, 78, 241/101.6, 101.7, 101 B, 101 M, 152 A, 154, 157, 158, 39

[56] References Cited
UNITED STATES PATENTS

| | | | |
|---|---|---|---|
| 1,973,836 | 9/1934 | Woodhead et al. | 241/43 |
| 2,460,938 | 2/1949 | Koehne | 241/154 X |
| 2,660,564 | 11/1953 | Davis | 241/39 X |
| 3,133,727 | 5/1964 | Luscombe | 241/101 B |

*Primary Examiner*—Gerald A. Dost
*Assistant Examiner*—Craig R. Feinberg
*Attorney, Agent, or Firm*—Holman & Stern

[57] ABSTRACT

A dust abatement system for a mixing apparatus for materials such as livestock feed including means for removing fine particles of the feed materials from a shredding means carried by the discharge end of a feeding conveyor table and simultaneously removing fine particles of the feed materials from a conduit communicating a milling means with the mixing tank and creating a negative pressure within the milling means to prevent dusting therein and also to increase its capacity.

6 Claims, 4 Drawing Figures

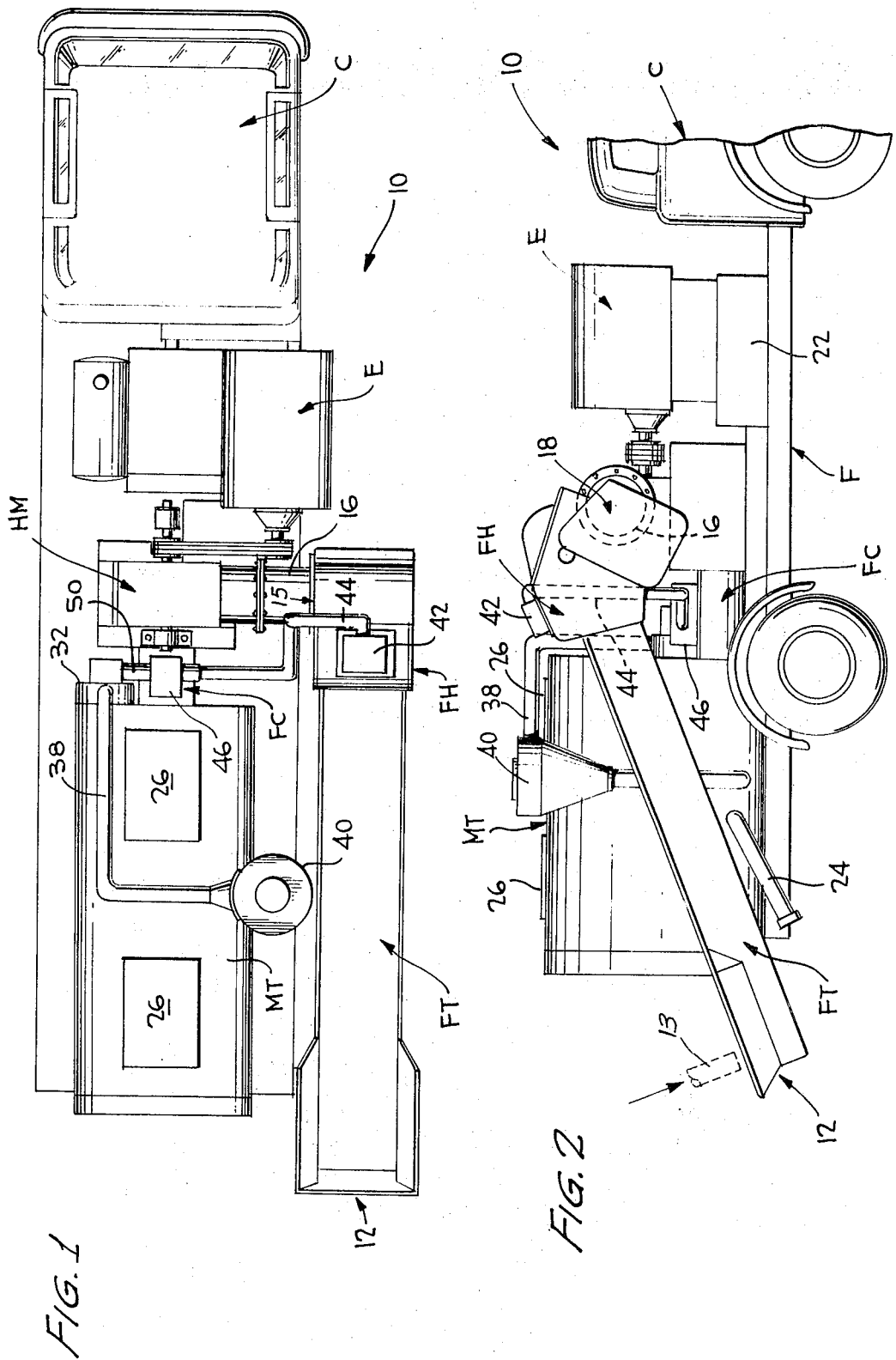

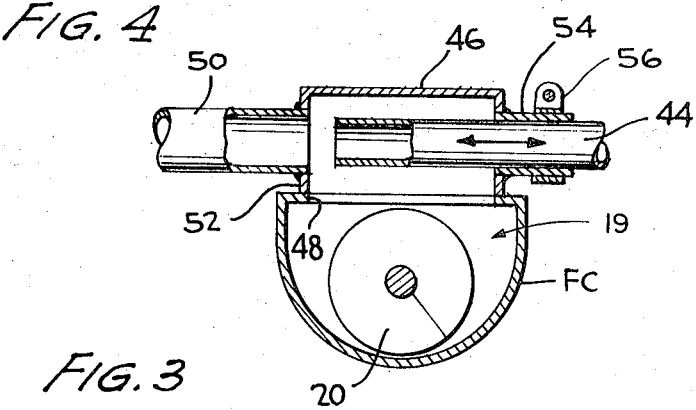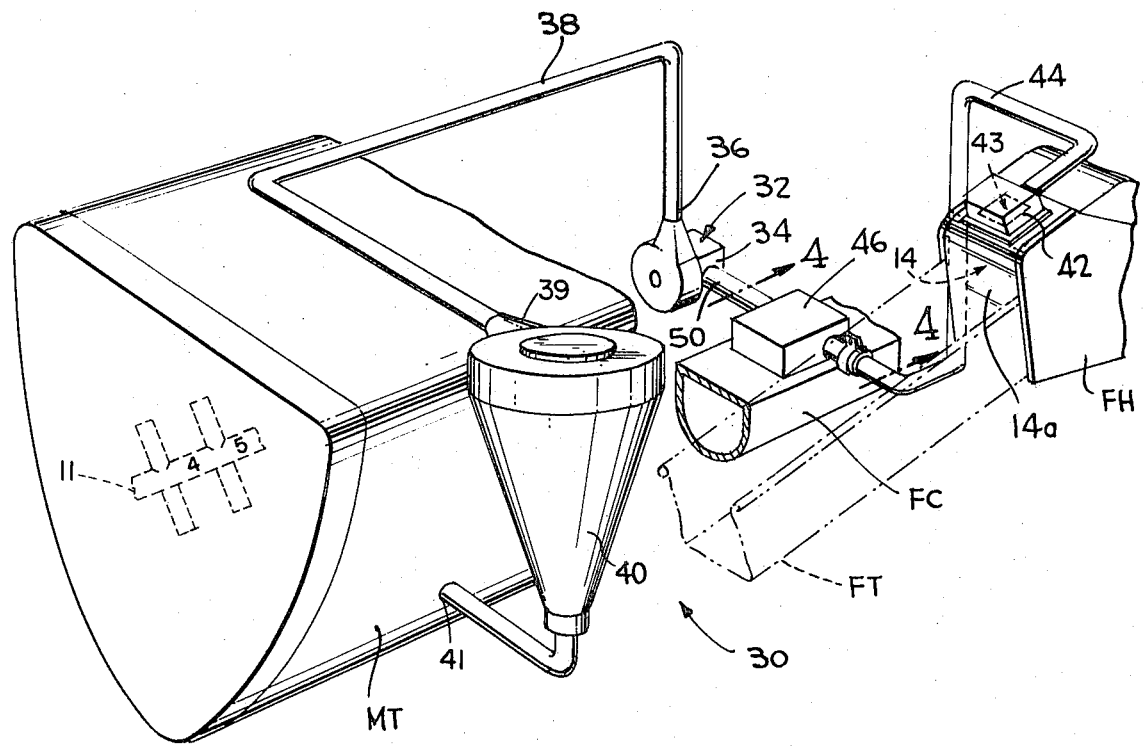

DUST ABATEMENT SYSTEM FOR MIXING APPARATUS

BACKGROUND OF THE INVENTION

This invention relates generally to a dust abatement system for a mixing apparatus for fluent materials such as livestock feed. Specifically, the instant invention is intended to provide particular dust removal means for use with a mobile mixing apparatus of the general type disclosed in U.S. application Ser. No. 194,874 filed Nov. 2, 1971 now U.S. Pat. No. 3,804,377, and commonly assigned, the entire disclosure of which is incorporated herein by reference.

As will be seen from the foregoing application, mobile mixing devices are known for mixing fluent materials such as livestock feeds in the form of grains and the like, such apparatus comprising a mixing tank having various types of mixing means therein, mounted upon a mobile frame which is either self-propelled or which is towed behind a truck or other self-propelled vehicle. The apparatus shown in the foregoing application has proven to be quite satisfactory in most applications although difficulties are sometimes caused by the presence of dust or fine particles of the livestock feed material causing undesirable air pollution, as well as a loss of a portion of the feed materials and, thus, a reduction in the efficiency of the apparatus.

It is therefore a primary object of the instant invention to provide a dust abatement system for a mobile mixing apparatus which minimizes loss of the livestock feed materials, minimizes air pollution and increases the efficiency of the overall apparatus. More specifically, it is a primary object of this invention to provide a dust abatement system of the type described which precludes escape of fine particles of the livestock feed material from the shredding means incorporated at the discharge end of the feeding conveyor table. Moreover, it is an important objective of this invention to simultaneously remove fine particles of the livestock feed materials from the conduit provided between the hammermill utilized to comminute solid particles, and the mixing tank in which the solid particles are intimately mixed with each other and with fluid additives such as molasses and liquid protein. Additionally, the dust abatement system of the instant invention provides a negative pressure across the hammermill to prevent dusting at that point and to increase the capacity of the hammermill by creating a suction under the hammermill screen.

It is another important object of this invention to provide a dust abatement system which is adjustable and can be balanced across its various components as desired.

SUMMARY OF THE INVENTION

The above objects, as well as others which will become apparent as the description proceeds, are fulfilled by the present dust abatement system wherein a fan is provided to produce a negative pressure communicated through tubing means with a dust baffle over the conduit between the milling means and the mixing tank and, in series, with a further dust baffle over the housing means containing the roughage shredding device at the discharge end of the feeding conveyor table. The fine particles collected in the tubing means are blown through the fan to a cyclone dust collector which communicates with the mixing tank. The negative pressure in the tubing system is rendered adjustable preferably by utilizing different size tubing materials communicating with opposite sides of the dust baffle over the feed conduit between the hammermill and the mixing means, one portion of the tubing means being slidably secured so that its end can be spaced at a desired distance from the opposed end of the remaining tubing means connected to the foregoing dust baffle.

BRIEF DESCRIPTION OF THE DRAWINGS

The invention itself will be better understood, and additional objects, features and advantages thereof will become apparent, from the following detailed description of a preferred embodiment of the instant inventive concepts, taken in conjunction with the accompanying drawings wherein:

FIG. 1 is a plan view of a mobile mixing apparatus incorporating a dust abatement system according to this invention;

FIG. 2 is a side elevational view thereof, partially broken away for illustrative clarity;

FIG. 3 is a fragmentary enlarged perspective view of the particular components of the overall apparatus which form the dust abatement system of the instant invention; and FIG. 4 is a fragmentary enlarged cross-sectional view taken substantially along lines 4—4 of FIG. 3 and particularly illustrating the techniques by which the pressure in the tubing of the dust abatement system may be adjusted.

Like reference characters refer to like parts throughout the several views of the drawings.

DETAILED DESCRIPTION OF THE PREFERRED EMBODIMENT

Referring now to the drawings, and more particularly to FIGS. 1 and 2, a mobile mixing apparatus according to the instant inventive concepts is designated generally by the reference numeral 10 and will be seen to be similar in most respects to the apparatus shown in the aforementioned application. While the device is shown particularly as used in a mobile mixing apparatus, it will be obvious that the dust abatement system which forms the primary feature hereof could be utilized as well in a stationary mixing apparatus for fluent material such as livestock feeds.

In the embodiment shown in the drawings, a mobile vehicle frame F will be seen, which may advantageously form a part of a self-propelled vehicle such as a truck having a conventional cab C at its forward end. Mounted on the rearward portion of the vehicle frame F is a mixing tank MT having any conventional mixing and conveying means therewithin, such as those shown in the aforementioned application, or such as shown schematically in FIG. 3 at 11.

In the embodiment shown in this application, an elongated feeding conveyor means or table is shown at FT mounted on the vehicle frame to one side of the frame, and extending rearwardly along the length of the mixing tank MT, terminating beyond the rear end thereof as will be seen in FIGS. 1 and 2. Of course, it is possible to use a forwardly extending feeding conveyor table as shown in the aforementioned application with slight modification that would be obvious to those skilled in the art.

The details of the feeding conveyor and the manner in which it can be extended, if desired, or adjusted vertically or laterally to position its receiving end 12 at a desired location, are not important to the instant inventive concepts and, again, can take the form shown in the aforementioned application, if desired. In any event, solid livestock feed materials are received from a source shown schematically at 13 at the end 12 of the feeding conveyor means FT and are conveyed along the length thereof to the discharge end of the feeding conveyor means which is surrounded by a feed housing FH means having an inlet end 14 covered by a hinged gate 14a and an outlet end 15 communicating with a conduit means 16 associated with a milling means such as a hammermill HM.

A roughage shredding means designated generally by the reference numeral 18 of any conventional form is operatively associated within the housing means HM between the inlet and outlet openings thereof for preparing coarse, fibrous livestock feed materials, such as hay, prior to introduction into the hammermill HM.

The milling means may take any conventional form, preferably a hammermill which includes an underlying screen (not shown) as is conventional. This milling means comminutes the solid livestock feed materials into a fluent state prior to feeding the same into the mixing tank MT through a feed conduit FC, the forward end of which is disposed underneath and in communication with the interior of the hammermill HM, through hammermill outlet 19 and the rearward end of which extends into the interior of the mixing tank MT, with an auger or other conveying means schematically shown at 20 in FIG. 4, passing through the feed conduit FC and, if desired, forming part of the mixing means 11 within the mixing tank MT.

Also mounted on the mobile vehicle frame F is a diesel or other internal combustion engine E for supplying power to the agitators within the mixing tank MT and to the hammermill HM. Further, supply tanks such as shown at 22 are provided for various liquid components such as molasses, liquid protein or the like, any conventional means (not shown) being included to feed selected quantities of such liquid components to the mixing tank MT.

An outlet designated generally by the reference numeral 24 is provided for selectively removing the mixed livestock feed, this outlet incorporating any conventional means to facilitate the emptying operation and for permitting the feed materials to be bagged or delivered to a remote location.

Additionally, hatches with covers such as shown at 26 are provided in the mixing tank MT for cleaning or other purposes.

A preferred form of the dust abatement system of the instant invention is designated generally by the reference numeral 30 in FIG. 3 and comprises basically a fan means 32 having an inlet end 34 at which a negative pressure is produced and an outlet end 36 at which a positive pressure is produced.

Tubing means of any form 38 communicate the outlet end 36 of the fan means 32 with the mixing tank MT, preferably through the intermediary of a cyclone or dust collector 40, having an inlet 39 and an outlet 41, the details of the collector being conventional, and therefore need not be explained in detail herein.

A housing dust baffle 42 is secured over an opening 43 in the feed housing FH and communicates with the shredding means therewithin. A section of tubing 44 is connected between the housing dust baffle 42 and one side of a conduit dust baffle 46 secured over an opening 48 (note FIG. 4) in the feed conduit FC. A further section of tubing 50 communicates between an opposed side portion of the conduit dust baffle 46 and the inlet end 34 of the fan means 32.

The foregoing system, when the fan means 32 is operated in any conventional manner, provides a negative pressure within the feed housing FH to remove dust or fine particles of the livestock feed materials from the housing means and preclude escape thereof through the inlet opening of the housing means thereby avoiding the loss of such materials and minimizing air pollution as well.

Additionally, a negative pressure is provided within the feed conduit FC, withdrawing dust therefrom, and simultaneously creating an air flow through the hammermill between the inlet and outlet ends thereof to prevent dusting within the hammermill and also to increase the capacity of the hammermill by creating a negative pressure under the hammermill screen.

The fine particles of livestock feed materials collected in the dust abatement system are blown by the fan means 32 through the tubing 38 and the cyclone 40 into the mixing tank MT thereby forming a part of the final mixed fluent feed produced by the apparatus of this invention.

According to a feature of the instant inventive concepts, the negative pressure produced by the dust abatement system of this invention may be adjusted, a preferred construction for enabling such adjustment being shown particularly in FIGS. 3 and 4. It will be seen that the tubing section 50 is fixedly secured to one side 52 of the conduit dust baffle 46 while the end of the tubing section 44 is slidingly carried within a sleeve 54 in opposed relationship thereto, a clamping means of any conventional form 56 being provided to secure the end of the tubing section 44 at any desired location in spaced relationship to the end of the tubing section 50. The diameters of the tubing sections 44 and 50 are preferably different, the tubing section 44 being of a smaller diameter in order to create a Venturi effect between the opposed ends of the tubing sections 44, 50 thereby further increasing the effectiveness of the negative pressure applied to the feed conduit FC.

Of course, the various tubing sections must either be made of a flexible material or have adjustable elbows as necessary in order to permit the relative movement indicated above. Additionally, the actual size of the tubing material is not critical, although it has been found that the use of a tubing material of a 4 inch diameter for the tubing 44 and a tubing material of a 5 inch diameter for the tubing 50 is particularly suitable.

By enabling the end of the tubing section 44 to be moved closer or away from the end of the tubing section 50, a balanced negative pressure may be selectively applied over the feed conduit FC and the feed housing FH.

It will now be seen that there is herein provided a dust abatement system for a mixing apparatus which satisfies all of the objectives of the instant inventive concepts as set forth above, and others, including many advantages of great practical utility and commercial importance.

We claim:

1. A mixing apparatus for materials such as livestock feed comprising, in combination, a mixing tank, means within said mixing tank for mixing fluent materials fed into said mixing tank, milling means for comminuting solid livestock feed materials into a fluent state prior to feeding same into said mixing tank, first conduit means communicating the outlet of said milling means with said mixing tank, feeding conveyor means for receiving solid livestock feed materials from a source of same, said feeding conveyor means having a discharge end remote from said source to which the solid livestock feed materials are conveyed, housing means overlying said discharge end of said feeding conveyor means and having an inlet and an outlet opening, shredding means operatively associated within said housing means between said inlet and outlet openings for preparing coarse solid livestock feed materials for said milling means, second conduit means communicating said outlet of said housing means with the inlet of said milling means, and a dust abatement means for removing fine particles of said livestock feed materials from said housing means to preclude escape thereof through said inlet opening of said housing means and for simultaneously removing such fine particles from said first conduit means and creating a negative pressure between the inlet and the outlet of said milling means, said dust abatement means delivering said fine particles to said mixing tank, said dust abatement means comprising fan means including an inlet end at which a negative pressure is produced and an outlet end at which a positive pressure is produced, a housing dust baffle secured over an opening in said housing means, and a conduit dust baffle secured over an opening in said first conduit means, said conduit dust baffle having spaced side walls, a first tube section having one end communicating with said housing dust baffle and a second end communicating with one side wall of said conduit dust baffle, a second tube section having one end communicating with the other side wall of said conduit dust baffle and a second end communicating with said inlet of said fan means, and additional tubing means connecting said outlet end of said fan means to said mixing tank, the end of one of said tube sections communicating with said conduit dust baffle being slidingly received in its associated side wall to permit it to be positioned within said conduit dust baffle at a selected distance from the end of the other tube section which is opposed thereto.

2. The apparatus of claim 1 wherein all of said components are carried on a mobile vehicle frame.

3. The apparatus of claim 1 wherein said milling means is a hammermill.

4. The apparatus of claim 1 further including a cyclone dust collector means having an inlet end connected to said additional tubing means and an outlet end communicating with said mixing tank.

5. The apparatus of claim 1 wherein the diameter of the end of said one tube section is smaller than the diameter of the end of said other tube section.

6. The apparatus of claim 1 further including means for clamping said end of said one tube section in a slidingly adjusted relationship.

* * * * *